Patented Jan. 19, 1954

2,666,688

UNITED STATES PATENT OFFICE 2,666,688

METHOD OF MAKING STABLE CUPRIC HYDROXIDE

William H. Furness, Haddonfield, N. J., assignor to Copper Research, a corporation of New Jersey No Drawing. Application May 5, 1951, Serial No. 224,840

3 Claims. (Cl. 23—147)

The object of this invention is to provide a simple, inexpensive method for making stable cupric hydroxide, with a by-product of sodium sulphate, by means of a controlled, indirect reaction between copper sulphate and sodium hydroxide.

It is known that stable, separable cupric hydroxide cannot be made by direct reaction between copper sulphate and sodium hydroxide. The combination of these two chemicals results in the formation of a gelatinous, inseparable sludge of blue cupric hydroxide which rapidly changes to a useless sludge of black cupric oxide.

Because of the lack of a simple, inexpensive method of manufacture, cupric hydroxide has not heretofore been generally available for commerce in the large quantities required for use as a fungicide in agriculture, for antifouling ship bottom paints, and other similar purposes.

In my process, pure, stable cupric hydroxide is made from copper sulphate and sodium hydroxide in the following manner:

Step 1.—Dissolve 380 parts trisodium phosphate ($Na_3PO_4 12H_2O$) using only enough water to afford complete solution at room temperature.

Step 2.—Place the trisodium phosphate solution of step 1 in a tank of large size compared to the volume of the solution; for example, a 100 gallon tank if the volume of solution prepared under step 1 is one gallon.

Step 3.—To the trisodium phosphate solution in the tank add 250 parts copper sulphate ($CuSO_4 5H_2O$) dissolved in the minimum quantity of water required for solution at room temperature. Mix by stirring.

Step 4.—Add to the contents of the tank a solution containing 80 parts sodium hydroxide (NaOH), in a concentration of about 80 gm. per liter at room temperature. Mix by stirring.

Step 5.—Add a second quantity of copper sulphate solution as in step 3.

Step 6.—Add a second quantity of sodium hydroxide as in step 4.

Continue the process by adding successive alternate quantities of copper sulphate and sodium hydroxide until the tank is nearly full. No trisodium phosphate is employed other than the original quantity specified in step 1.

When the tank is nearly full the process is stopped at a point corresponding with step 3, that is, after the addition of copper sulphate, and the precipitate is permitted to settle. The supernatant liquid is then drawn off for recovery of sodium sulphate, which at this point is the only chemical in solution.

As the volume remaining in the tank is greatly reduced by removal of the supernatant sodium sulphate solution the step procedure may be resumed by adding caustic soda, as in step 4, followed by copper sulphate as in step 3, repeatedly until the tank is again nearly filled, when settling and decantation are again carried out.

The step process is continued until the insoluble cupric hydroxide, resulting from the intermittent alternate additions and reactions of copper sulphate and sodium hydroxide, nearly fills the tank after settling. At this stage the process is stopped at a point corresponding to step 4, that is, with a final addition of the quantity of sodium hydroxide specified in that step. The entire contents of the tank is then fed to a filter on which the cupric hydroxide is collected; the filtrate, containing the original quantity of trisodium phosphate, in solution, is returned to the mixing tank, where the process of adding alternate quantities of copper sulphate and sodium hydroxide may be repeated indefinitely as described.

The following chemical formula is offered as an indication of probable reactions which occur repeatedly during the process as new additions of copper sulphate and sodium hydroxide are made:

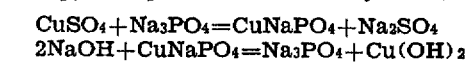

$$CuSO_4 + Na_3PO_4 = CuNaPO_4 + Na_2SO_4$$
$$2NaOH + CuNaPO_4 = Na_3PO_4 + Cu(OH)_2$$

As the time element of the chemical reactions involved in the process is very small, and no appreciable increase of temperature occurs, the alternate additions of copper sulphate and sodium hydroxide may be made at brief intervals, and large quantities of cupric hydroxide and sodium sulphate are thus accumulated in a short time.

While my method may be used to make single batches of cupric hydroxide, I prefer to employ the step method described, in which only a relatively small and fixed quantity of trisodium phosphate or copper sodium phosphate alternatively are present. Copper sodium phosphate is difficult to remove by settling or filtration on a large scale, while the small quantities present at intervals in the step process are carried down with the rapidly settling accumulation of cupric hydroxide, and do not interfere with the decantation of the supernatant liquid containing the sodium sulphate in solution.

The action of trisodium phosphate on copper sulphate in aqueous solution is such that all of the copper contained in a molecular equivalent of copper sulphate is precipitated by the addition of less than a molecular equivalent of trisodium phosphate. For example, if 250 gms. of trisodium phosphate (Na₃PO₄12H₂O) are added to 250 gms. copper sulphate (CuSO₄5H₂O) in aqueous solution, all of the copper will be precipitated and the water will show a neutral reaction with phenolphthalein. Any additional amount of trisodium phosphate (Na₃PO₄12H₂O) up to a total of 380 gms. will react with the precipitated copper, the water remaining neutral. The nature of the copper precipitate varies with the amount of trisodium phosphate added but all such precipitates are converted to cupric hydroxide by the addition of a molecular proportion of sodium hydroxide, the trisodium phosphate being regenerated in the amount originally used in each instance. While I prefer to use trisodium phosphate in the proportion of 380 gms.

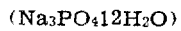

(Na₃PO₄12H₂O)

to 250 gms. copper sulphate (CuSO₄5H₂O) because a better grade of cupric hydroxide results from that formula, it is to be understood that the scope of my invention includes the use of any smaller proportion of trisodium phosphate which will entirely precipitate copper sulphate from solution.

I claim:

1. The method of making cupric hydroxide and sodium sulphate from copper sulphate and sodium hydroxide which consists of mixing 250 parts of copper sulphate (CuSO₄5H₂O) with 380 parts of trisodium phosphate (Na₃PO₄12H₂O) in aqueous solution and subsequently adding thereto an aqueous solution containing 80 parts of sodium hydroxide (NaOH), to form approximately 98 parts cupric hydroxide Cu(OH)₂, 142 parts of sodium sulphate (Na₂SO₄), and 194 parts of trisodium phosphate (Na₃PO₄), removing the cupric hydroxide by filtration and repeating the process by adding 250 gms. copper sulphate

(CuSO₄10H₂O)

to the filtrate, followed by 80 gms. caustic soda (NaOH) to produce a second 98 gms. cupric hydroxide.

2. The method of making cupric hydroxide and sodium sulphate from copper sulphate and caustic soda by adding trisodium phosphate to a copper sulphate solution in sufficient quantity to precipitate all of the copper contained therein as copper sodium phosphate, and to react with all of the sulphate radical of the copper sulphate to form sodium sulphate in solution, and then adding to the mixture a sufficient quantity of caustic soda to convert the insoluble copper sodium phosphate to insoluble cupric hydroxide and trisodium phosphate and removing the cupric hydroxide by filtration; thereafter adding to the filtrate sufficient copper sulphate to react with the trisodium phosphate present therein to form copper sodium phosphate and sodium sulphate and removing the insoluble copper sodium phosphate by filtration and recovering the sodium sulphate from the filtrate by crystallization or evaporation.

3. The cyclic process of making cupric hydroxide from copper sulphate and caustic soda in which molecularly equivalent and equal unit masses of copper sulphate and caustic soda are added repeatedly and alternately to a volume of water containing a quantity of trisodium phosphate sufficient to convert all of the copper contained in the unit of copper sulphate first added to insoluble copper sodium phosphate and sodium sulphate, and in which each addition of copper sulphate is followed by a molecularly equivalent quantity of caustic soda which reacts with the copper sodium phosphate resulting from the preceding step to form cupric hydroxide and trisodium phosphate, the repeated alternate additions of the unit masses of copper sulphate and caustic soda resulting in an accumulation of cupric hydroxide and sodium sulphate in the mixture, from which part of the cupric hydroxide is removed from time to time by filtration at any interval following an addition of caustic soda when the phosphate radical is in solution, and part of the accumulated sodium sulphate is removed from time to time by filtration or decantation during an interval following an addition of copper sulphate when the phosphate radical is present in the mixture in insoluble form.

WILLIAM H. FURNESS.

References Cited in the file of this patent
UNITED STATES PATENTS

| Number | Name | Date |
|---|---|---|
| 1,800,828 | Furness | Apr. 14, 1931 |
| 2,168,985 | Gulbrandsen | Aug. 8, 1939 |
| 2,532,308 | Hoffman | Dec. 5, 1950 |